United States Patent
Cutrell et al.

(10) Patent No.: US 7,818,372 B1
(45) Date of Patent: Oct. 19, 2010

(54) WEB PORTAL FRAMEWORK FOR OPEN INNOVATION

(75) Inventors: George Cutrell, Reston, VA (US); Wing K. Lee, Overland Park, KS (US); Craig Macha, Carrollton, TX (US); Sunil K. Ponnangath, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 282 days.

(21) Appl. No.: 12/015,354

(22) Filed: Jan. 16, 2008

(51) Int. Cl.
*G06F 15/16* (2006.01)
*G06F 17/21* (2006.01)
*G06F 17/24* (2006.01)
*H04L 12/16* (2006.01)
*G06F 3/00* (2006.01)
*G06F 17/00* (2006.01)
*H04Q 11/00* (2006.01)

(52) U.S. Cl. .................. 709/204; 709/205; 715/236; 715/753; 370/260

(58) Field of Classification Search ......... 709/203–205, 709/219; 715/235, 236, 240, 753; 370/260
See application file for complete search history.

(56) References Cited

U.S. PATENT DOCUMENTS

| | | | | |
|---|---|---|---|---|
| 7,266,806 B2 * | 9/2007 | Choi et al. | ............ | 717/108 |
| 7,272,782 B2 * | 9/2007 | Sneh | ............ | 715/205 |
| 7,277,924 B1 * | 10/2007 | Wichmann et al. | ............ | 709/217 |
| 7,389,321 B2 * | 6/2008 | Estrada et al. | ............ | 709/205 |
| 7,401,128 B1 * | 7/2008 | Mueller | ............ | 709/217 |
| 7,493,563 B2 * | 2/2009 | Bohn et al. | ............ | 715/736 |
| 7,505,998 B2 * | 3/2009 | Barrett | ............ | 707/104.1 |
| 7,523,174 B2 * | 4/2009 | Junghuber et al. | ............ | 709/219 |
| 7,533,142 B2 * | 5/2009 | Ng et al. | ............ | 709/202 |
| 7,548,957 B1 * | 6/2009 | Wichmann et al. | ............ | 709/217 |
| 7,590,687 B2 * | 9/2009 | Bales et al. | ............ | 709/203 |
| 7,634,539 B2 * | 12/2009 | Schwarz et al. | ............ | 709/204 |
| 7,676,542 B2 * | 3/2010 | Moser et al. | ............ | 709/204 |
| 7,703,022 B2 * | 4/2010 | Arthurs et al. | ............ | 715/742 |
| 7,707,249 B2 * | 4/2010 | Spataro et al. | ............ | 709/205 |
| 7,716,640 B2 * | 5/2010 | Pik et al. | ............ | 717/124 |
| 7,725,560 B2 * | 5/2010 | Bales et al. | ............ | 709/217 |
| 2006/0128000 A1 * | 6/2006 | Kataoka et al. | ............ | 435/148 |
| 2006/0235691 A1 * | 10/2006 | Tomasic et al. | ............ | 704/257 |
| 2007/0214449 A1 * | 9/2007 | Choi et al. | ............ | 717/100 |

(Continued)

OTHER PUBLICATIONS

Kerzer, Harold, "Project Management: A Systems Approach to Planning, Scheduling, and Controlling," New York, N.Y., John Wiley & Sons, 2001, 7th Edition, p. 83. HD69 P75 K47 2000.

*Primary Examiner*—Vivek Srivastava
*Assistant Examiner*—Melvin H Pollack

(57) ABSTRACT

A system for a project web portal is provided. The system includes a plurality of user interfaces, a storage device, a processor, instructions, and an administrator user interface. When executed by the processor, the instructions provision the project web portal to the plurality of user interfaces, wherein the project web portal comprises a web log portlet, a forum portlet, and a survey portlet. The instructions also store project data in the storage device, wherein the project data comprises a user input received via the web log portlet, a discussion data received via the forum portlet, and an answer data received via the survey portlet. The administrator user interface accesses the project data in the storage device to develop a project.

20 Claims, 4 Drawing Sheets

U.S. PATENT DOCUMENTS

2008/0052358 A1* 2/2008 Beaven et al. ............... 709/205
2008/0086527 A1* 4/2008 Sposetti et al. .............. 709/204
2008/0086736 A1* 4/2008 Timmons ................... 719/314
2008/0126486 A1* 5/2008 Heist et al. .................. 709/205
2008/0147453 A1* 6/2008 Kogan et al. ................... 705/7

* cited by examiner

WEB PORTAL FRAMEWORK FOR OPEN INNOVATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A product development project is a temporary endeavor undertaken to develop a new product or service. An organization may use a product development tool to organize and optimize the allocation of resources for a stream of product development projects. Projects in different phases of development are governed to various degrees to insure that the project is completed on time and within budget. The complexity of product development can make it difficult to organize project information and monitor the product development to identify and correct problems.

SUMMARY

Disclosed herein are improved systems and methods for a web portal framework for open innovation, which may be implemented as a project web portal. One embodiment includes a plurality of user interfaces, a storage device, a processor, instructions, and an administrator user interface. When executed by the processor, the instructions provision the project web portal to the plurality of user interfaces, wherein the project web portal includes a web log portlet, a forum portlet, and a survey portlet. The instructions also store project data in the storage device, wherein the project data includes a user input received via the web log portlet, a discussion data received via the forum portlet, and an answer data received via the survey portlet. The administrator user interface accesses the project data in the storage device to develop a project.

In a computer implemented method embodiment, a project web portal template is provisioned to a plurality of user interfaces. The project web portal template includes a web log portlet template, a forum portlet template, and a survey portlet template. A web log portlet is created based on the web log portlet template when the web log portlet template is first accessed. A forum portlet is created based on the forum portlet template when the forum portlet template is first accessed. A survey portlet is created based on the survey portlet template when the survey portlet template is first accessed. Project data is stored. The project data includes a user input received via the web log portlet, a discussion data received via the forum portlet, and an answer data received via the survey portlet. The project data is accessed to develop a project.

In another computer implemented method embodiment, a product test web portal is provisioned to a plurality of user interfaces associated with product test participants. The product test web portal includes a web log portlet, a forum portlet, and a survey portlet. Product test data is stored. The product test data includes a user input received via the web log portlet, a discussion data received via the forum portlet, and an answer data received via the survey portlet. The product test data is accessed to manage a product test.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
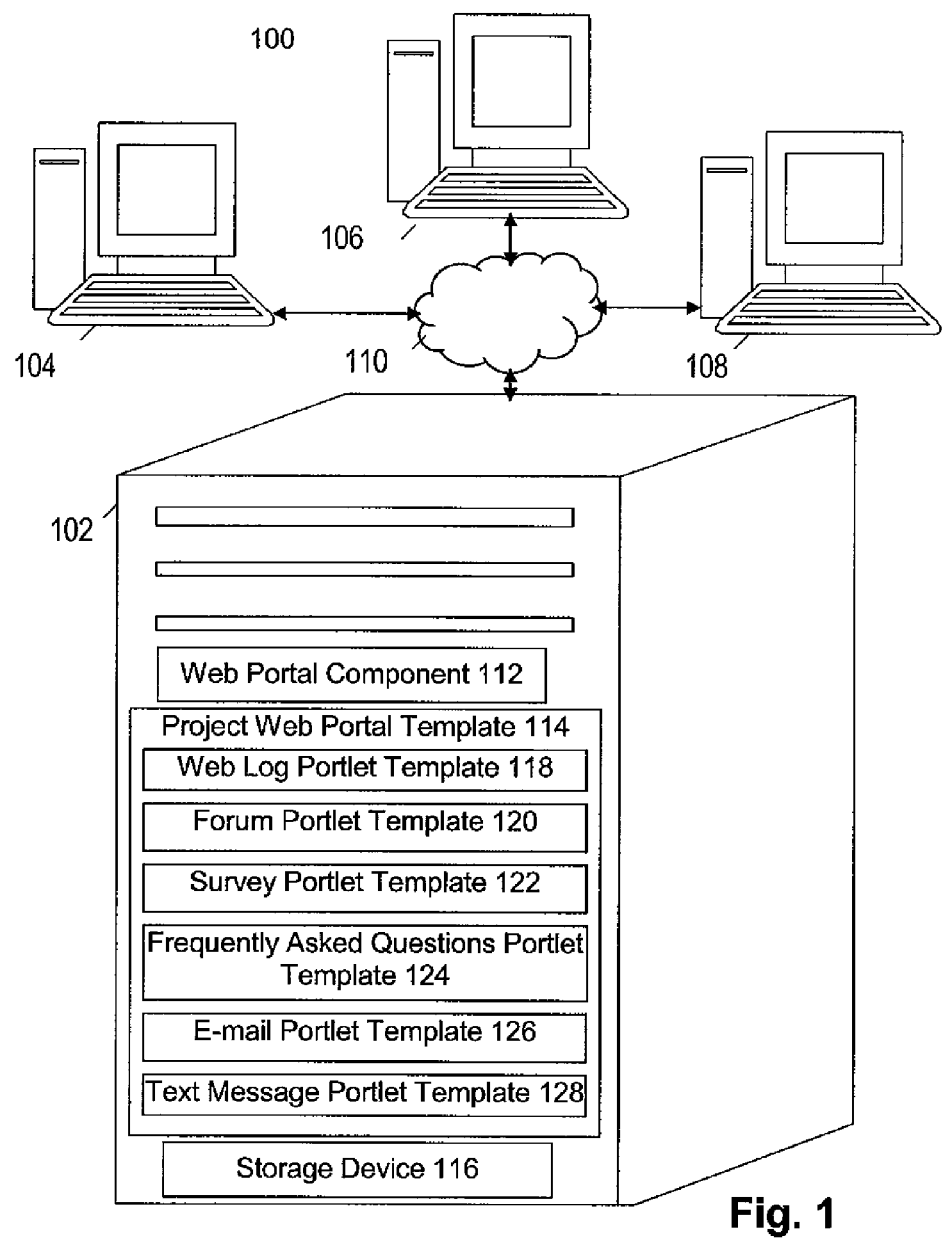
FIG. 1 shows a block diagram of system for a project web portal, according to some embodiments of the present disclosure

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Project participants are individuals or groups that are involved in the development of a project, such as a project developer during the conception phase of the project, or in the evaluation of the project, such as individuals who agree to test the product produced by the project during a product test phase. A typical project development process may include a concept phase, a planning phase, a definition and design phase, an implementation phase, and a product test phase. In some cases, however, the project development process may include any number and types of phases. Different types of projects that employ a development process can include engineering projects, manufacturing projects, computer programming projects, and construction projects. For example, the development process for an engineering project can include a start-up phase, a definition phase, a main phase, and a termination phase. Examples of different project phases for different types of projects can be found in Kerzner, Harold, *Project Management: A Systems Approach to Planning, Scheduling, and Controlling.* New York, N.Y., John Wiley & Sons, 2001, 7$^{th}$ Edition. p. 83. HD69.P75 K47 2000. Traditionally, communication between project participants in each phase has been scattered throughout various media. For example, some engineers working on a mobile phone camera project during the concept phase may communicate with the project developer via paper memos while other engineers working on the same project may communicate with the project developer via electronic mail.

Some project management tools attempt to improve project communication during each phase through the use of web portals and portlets. A web portal is a web site that provides personalized capabilities to a visitor of the web site. Web portals are typically designed to use different types of middleware, hardware, and distributed applications to provide services to web site visitors from a number of different sources. Portlets are pluggable user interface components that are managed and displayed in a web portal. Portlets produce fragments of markup code that may be aggregated into a portal page. Typically, a portal page is displayed as a collection of non-overlapping portlet windows, where each portlet window displays a portlet. Hence a portlet, or collection of portlets, resembles a web-based application that is hosted in a portal.

However, project communication may still be scattered when using such a project management tool. One engineer may prefer to use an electronic mail portlet to communicate issues privately with the project developer while another engineer may prefer to raise issues in a discussion forum. Although both engineers may be addressing the same concept phase issue, the project developer may not be able to reference both communications together. Furthermore, during the product test phase, such project management tools do not offer a project manager any communication with the individuals who agree to test the product produced by the project. Typically, in the product test phase, a third party distributes the product with a survey, the product testers test the product, the product testers return the products and the surveys to the third party, and the third party returns the products and the surveys to the project manager. If the product tests and/or the surveys indicate a problem with the product, and the project manager devises a solution to the problem, the time lag involved in the distribution and return of both the products and the surveys results in a delay in the product testing and the total time required for completing the project.

Disclosed herein are improved systems and methods for a project web portal. The project web portal is provisioned to the user interfaces for the project participants. The project web portal includes a web log portlet, a forum portlet, and a survey portlet. The web log portlet, or blog portlet, may be a portlet that an individual project participant uses to express their own views about a project with other project participants and invite feedback from the other project participants, such as opinions about a specific feature of a new mobile phone camera. The forum portlet may be a portlet that a project developer creates to facilitate continuous discussions between all project participants, which may be based on a discussion thread, such as detailed discussions about all features of a new mobile phone camera. The survey portlet may be a portlet that a project developer uses to provide a list of survey questions for project participants to answer about a project, wherein the survey portlet stores the answers to the questions. Each project participant may create their own web log or discussion forum for the project based on their own topics of interest, and each web log and discussion forum may be accessed by all of the other project participants. Furthermore, the project participants are provisioned with other portlets that each project participant may directly edit in a collaborative manner, such as a wiki. For example, participants may edit a frequently asked questions portlet that is a wiki to clarify confusing language. The project web portal may also include an electronic mail portlet and a text messaging portlet so that all administrator communication with project participants and communication between project participants take place through the project web portal. Project data that is stored in a common storage device includes user inputs from the web log portlets, discussions from the forum portlets, and answers from the survey portlet. An administrator may enable project participants from multiple projects to access the portlets for a project, and the administrator may restrict access to the portlets to project participants for the specific project.

The project web portal creates an open environment that connects project participants, both direct and indirect participants, to project ideas to get the participants' support and engagement on a near real-time basis. The collaboration environment promotes open innovation based on the availability of the right information at the right time, thereby increasing the development speed and quality of projects. A project developer may access the project data from all of the portlets to develop a project during each project phase. For example, during the concept phase of the project, the project developer can aggregate discussion forum suggestions about a problem from engineers who are not working on the project with responses to a web log topic about the problem from engineers who are working on the project. The project developer may use the project web portal to promote collaboration with third party vendors who are invited to assist with the concept phase of the project and/or the product test phase based on the project. The project developer may use the project web portal to promote participation of end users, for example, requirements analysts or systems engineers at enterprise customers. In another example, during the product test phase of the project, the project manager can access survey answers from product testers, devise a solution to a problem identified by the survey answers, implement the solution through firmware over the air, and provide an updated survey to test the solution. The project manager may use the web log to inform product testers about the solution to the problem and update the frequently asked questions portlet to explain the solution for product testers who may subsequently encounter the problem. After encountering the problem, the product testers may edit the frequently asked questions portlet, if it is a wiki, to reflect their own experiences with the problem and the solution.

In some embodiments, instead of a server provisioning a portal to the project participants, the server provisions a portal template to the project participants. In contrast to a portal, which includes portlets, the portal template includes portlet templates. Provisioning a portal template and portlet templates to numerous project participants requires less time for the server. When a project participant accesses one of the portlet templates, the server creates the requested portlet based on the portlet template. Waiting until a portlet is accessed to create the portlet defers the creation time from when the server is provisioning to numerous project participants to a time when the server may be under a significantly reduced load. Furthermore, because some of the project participants do not access all of their portlet templates, each portlet that is not created may save the project manager a creation expense and/or a third party software license expense, as will be discussed in greater detail below.

Turning now to FIG. 1, a block diagram of system 100 for a project web portal is depicted. The system 100 includes a server 102, a first user interface 104, a second user interface 106, an administrator user interface 108, and a network 110. The user interfaces 104-108 are depicted as desktop computers in FIG. 1, although any electronic device having adequate computing power coupled to a user interface can be configured to carry out the methods disclosed herein. The server 102 and the user interfaces 104-108 can communicate with each other through the network 110. The numbers and types of the server 102 and the user interfaces 104-108 in FIG. 1 are depicted for the purpose of an illustrative example.

Software for the project web portal can be centrally located in the server 102, distributed throughout each of the user interfaces 104-108, or distributed in any combination through the server 102 and the user interfaces 104-108. In FIG. 1, the server 102 includes software for the project web portal, such as a web portal component 112 and a project web portal template 114, and a storage device 116. The server 102 may execute the web portal component 112 to provision a project web portal to each of the user interfaces 104-108 based on the project web portal template 114. Alternatively, the server 102 may execute the web portal component 112 to provision a copy of the project web portal template 114 to each of the user interfaces 104-108 based on the project web portal template 114. Whether the web portal component 112 provisions the project web portal or a copy of the project web portal template 114 may be based on considerations that are discussed below in reference to FIG. 3, box 304. The server 102 may also store project data, such as user inputs to the project web portals from the user interfaces 104-108 and product test results data, in the storage device 116.

The project web portal template 114 may include a web log portlet template 118, a forum portlet template 120, and a survey portlet template 122. The project web portal component 114 may also include a frequently asked questions portlet template 124, an electronic mail portlet template 126, and a text message portlet template 128. Each of the project web portal template 114, the web log portlet template 118, the forum portlet template 120, the survey portlet template 122, the frequently asked questions portlet template 124, the electronic mail portlet template 126, and the text message portlet template 128 may be a standardized file type used by computer software as a pre-formatted example on which to base other files. The web portal component 112 may provision a project web portal, a web log portlet, a forum portlet, a survey portlet, a frequently asked questions portlet, an electronic mail portlet, and a text message portlet to the user interfaces 104-108 based on the templates 114 and 118-128. Any of the portlet templates 114 and 118-128 may be implemented to be provisioned as a wiki, a collaborative web site which can be directly edited via any of the user interfaces 104-108. Each type of portlet is discussed below in reference to FIG. 3, boxes 304-310.

Figure 2:
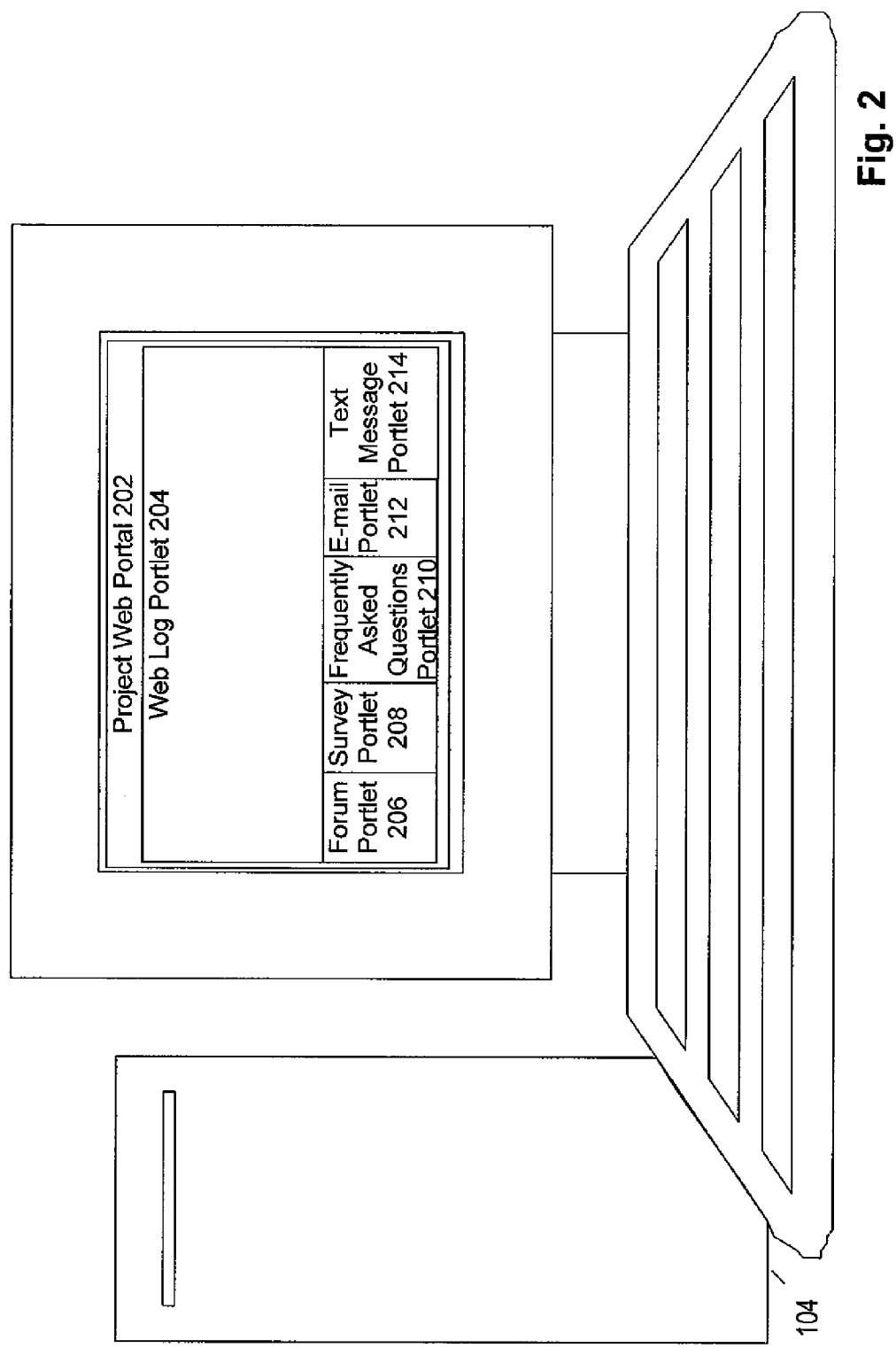
FIG. 2 shows a user interface for a project web portal according to some embodiments of the present disclosure.

Turning now to FIG. 2, the user interface 104 for a project web portal is depicted according to some embodiments of the present disclosure. The user interface 104 displays a project web portal 202, which includes a web log portlet 204, a forum portlet 206, a survey portlet 208, a frequently asked questions portlet 210, an e-mail portlet 212, and a text message portlet 214. The project web portal 202 may be created from the project web portal template 114, the web log portlet 204 may be created from the web log portlet template 118, the forum portlet 206 may be created from the forum portlet template 120, and the survey portlet 208 may be created from the survey portlet template 122. Additionally, the frequently asked questions portlet 210 may be created from the frequently asked questions portlet template 124, the e-mail portlet 212 may be created from the electronic mail portlet template 126, and the text message portlet 214 may be created from the text message portlet template 128. Each of the portlets 204-214 in the project web portal 202 may be accessed via the user interface 104.

For example, if the project web portal 202 depicts a web page that is currently displaying the web log portlet 204, a page navigation device may be used to scroll up, down, or across the currently displayed page of the web log portlet 204 to display another portion of the same web page that depicts one of the other portlets 206-214.

In another example, the page navigation device may be used to change the currently displayed page of the web log portlet 204 to another web page that depicts one of the other portlets 206-214.

In yet another example, the project web portal 202 depicts a web page that is currently displaying at least a portion for each of the web log portlet 204 and the other portlets 206-214 simultaneously. The portions of the portlets 204-214 displayed on the web page may be large enough for a user to read a portion from each portlet. Alternatively, the portions of the portlets 204-214 displayed on the web page may be large enough for a user to read a portion from some of the portlets 204-214, such as the web log portlet 204, with portions of the remaining portlets, such as the portlets 206-214, serving as options to select to read a greater amount of a selected portlet. For example, the portion of the web log portlet 204 is large enough for a user to read a portion from a web log, and the user may select the portion of the survey portlet 208 currently displayed to read a greater amount of a survey. The project web portal 202 may display only one portlet, such as the web log portlet 204, and display selectable buttons or tabs for selecting the display of each of the other portlets 206-214. The methods for viewing different portlets in a portal are described for the purposes of illustrative examples. Similarly, a project participant may access the web log portlets 204 and the forum portlets 206 associated with other project participants. The numbers and types of the portlets 204-214 in FIG. 2 are depicted for the purpose of an illustrative example.

Figure 3:
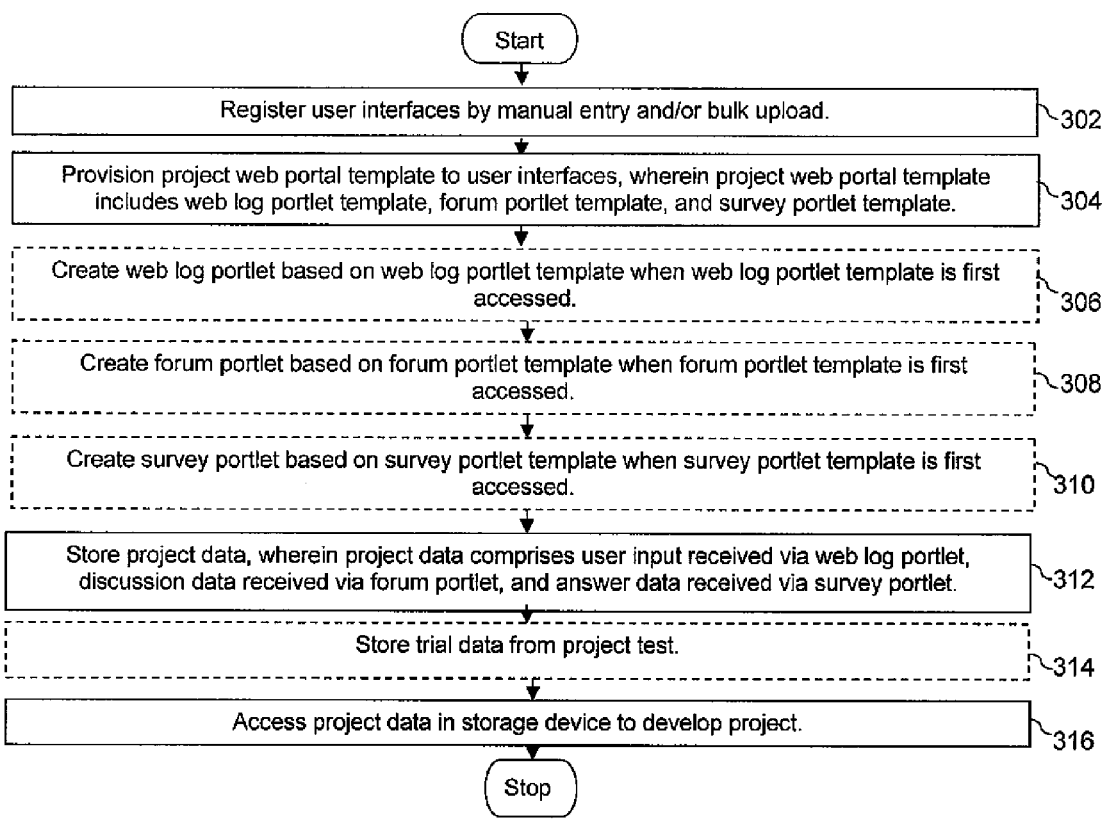
FIG. 3 shows a project web portal method according to some embodiments of the present disclosure.

Turning now to FIG. 3, a project web portal method is depicted according to some embodiments of the present disclosure. Executing the project web portal method depicted in FIG. 3 enables a project developer to develop a project based on project data collected from project participants' inputs via web log portlets, forum portlets and survey portlets.

In box 302, user interfaces are registered by at least one of manual entry and bulk upload. For example, the administrator user interface 108 registers the user interfaces 104 and 106 by a bulk upload of registration information for each of the project participants invited to submit project feedback. In another example, the administrator user interface 108 registers the user interfaces 104 and 106 via manual entry of the registration information. In yet another example, the project participants each manually enter their own registration information via the user interfaces 104 and 106.

In box 304, a server provisions a project web portal template to a plurality of user interfaces, wherein the project concept web portal template includes a web log portlet template, a forum portlet template, and a survey portlet template. For example, the server 102 provisions the project web portal template 114 to the user interfaces 104 and 106 for a mobile phone camera project. In this example, the project web portal template 114 includes the web log portlet template 118 for the mobile phone camera project, the forum portlet template 120 for the mobile phone camera project, and the survey portlet template 122 for the mobile phone camera project.

Alternatively, instead of provisioning a portal template that includes portlet templates, the server 102 may provision a portal that includes portlets. For example, the server 102 provisions the project web portal 202 to the plurality of user interfaces, wherein the project web portal 202 includes the web log portlet 204, the forum portlet 206, and the survey portlet 208. The provisioned project web portal 202 may also include the frequently asked questions portlet 210, the e-mail portlet 212, and the text message portlet 214. If the server 102 provisions the project web portal 202 and the portlets 204-208 instead of provisioning the project web portal template 114 and the portlet templates 118-128, the provisioning process is completed in box 304.

However, provisioning the web log portlet 204 that includes the portlets 206-214 is a process that may require more resources than the process of provisioning the project web portal template 114 and the portlet templates 118-128. Provisioning the web log portlet 204 that includes the portlets 206-214 may require more processing time for the server 102 because fully created portlets are provisioned, instead of portlet templates. Additionally, the provisioning of each portal that includes multiple portlets may incur an expense to be paid to a third party vendor that provides support for the provisioning process. Furthermore, the provisioning of each portal that includes multiple portlets may incur a software license expense to be paid to a third party software licensor. Due to such time and expense considerations, instead of provisioning the web log portlet 204 that includes the portlets 206-214, the server 102 may provision the project web portal template 114 and the portlet templates 118-128 to each of the user interfaces 104 and 106.

Provisioning the project web portal template 114 and the portlet templates 118-128 may require less processing time than provisioning the web log portlet 204 that includes the portlets 206-214. Furthermore, if the server 102 provisions the web log portlet template 118 to 100 user interfaces 104 and 106, and only 60 of the 100 user interfaces 104 and 106 actually create the web log portlet 204 from the web log portlet template 118, expenses are incurred to the third party vendor for only 60 instances of the web log portlet 204, not for 100 instances of the web log portlet 204. If the server 102 provisions the web log portlet 204 that includes the portlets 206-214, the method does not execute the optional boxes 306-310. If the server 102 provisions the project web portal template 114 and the portlet templates 118-128, the method executes the optional boxes 306-310.

Each of the web log portlet 204, the forum portlet 206, the survey portlet 208, and the frequently asked questions portlet 210 may be a collaborative web site which can be directly edited via any of the user interfaces 104 and 106. For example, the frequently asked questions portlet 210 may list a set of questions that a project manager anticipates will be frequently asked by project participants during the development of the project, along with answers corresponding to each of the questions. If a project participant is confused by the wording of a question or an answer listed in the frequently asked questions portlet 210, the project participant may directly use any of the user interfaces 104 and 106 to edit the question or answer so that other project participants are not confused by the wording. Similarly, any of the project participants may add, modify, or delete content on the web log portlet 204, the forum portlet 206, the survey portlet 208, and the frequently asked questions portlet 210.

The administrator user interface 108 may be used by an administrator to manage project participants, such as registering or deleting project participants, sending electronic mail to project participants via the e-mail portlet 212 and sending text messages to project participants via the text message portlet 214. The project participants may also use the e-mail portlet 212 to send electronic mail to the administrator and other project participants and use the text message portlet 214 to send text messages to the administrator and other project participants. The administrator may use the e-mail portlet 212 and the text message portlet 214 to communicate privately with project participants about specific questions, with electronic mail messages sent to an e-mail account and text messages sent to a mobile device, such as a mobile phone. The project web portal 202 may also include a user manual portlet for a product test, a terms and conditions portlet, and a project participant guidelines portlet. The user manual portlet may include a user manual that informs a product test participant about the proper use of the product that is being tested. The terms and conditions portlet may include terms and conditions for a project participant, such as deadlines for specific types of project feedback and legal disclaimers for product usage. The project participant guidelines portlet may include guidelines that specify decorum for communications and when it is appropriate to e-mail or text message other project participants.

In box 306, a server optionally creates a web log portlet based on the web log portlet template when the web log portlet template is first accessed. For example, when the web log portlet template 118 is first accessed by the user interface 104, the server 102 creates the web log portlet 204 for the mobile phone camera project based on the web log portlet template 118. By waiting until the web log portlet template 118 is first accessed to create the web log portlet 204, the server 102 saves provisioning time by deferring the creation process to a future time when the server 102 may be under a significantly reduced load. Additionally, the server 102 may save creation or licensing expenses for each web log portlet template 118 that is provisioned but never accessed. This efficiency may also apply for the portlets created in boxes 308 and 310, which are described below. Each created web log portlet 204 is associated with one of the user interfaces 104 and 106. For example, if a project test involves 100 project participants, each of the project participants may create their own web log portlet 204. Furthermore, each project participant may create many of their own web log portlets 204. A project participant may use the web log portlet 204 to offer their input about the project to the other project participants, where the web log portlet 204 also provides an input field for the other project participants to offer feedback to the input, such that the feedback may be viewed by all of the project participants. For example, a project participant may use the web log portlet 204 to offer observations about the effects of lighting conditions on the photograph resolution for a mobile phone camera.

In box 308, a server optionally creates a forum portlet based on the forum portlet template when the forum portlet template is first accessed. For example, when the forum portlet template 120 is first accessed by the user interface 104, the server 102 creates the forum portlet 206 for the mobile phone camera project based on the forum portlet template 120. Each created forum portlet 206 is associated with one of the user interfaces 104 and 106. For example, if a project test involves 100 project participants, each of the project participants may create their own forum portlet 206. Furthermore, each project participant may create many of their own forum portlets 206. A project participant may use the forum portlet 206 to initiate a topical discussion about a project with the other project participants, where the forum portlet 206 also provides an input field for the other project participants to offer feedback to the topical discussion, such that the feedback may be viewed by all of the project participants. For example, a project participant may use the forum portlet 206 to initiate a discussion thread about photograph storage for a mobile phone camera. Messages about the discussion topic are usually grouped visually in a hierarchy based on the topic. For example, the most recent message about photograph storage may be displayed at the top of the forum portlet 206, followed by the second most recent message about photograph storage, which is followed by the third most recent message, etc.

In box 310, a server optionally creates a survey portlet based on the survey portlet template when the survey portlet template is first accessed. For example, when the survey portlet template 122 is first accessed by the user interface 104, the server 102 creates the survey portlet 208 for the mobile phone camera project based on the survey portlet template 122. The server 102 may push the survey portlet 208, which includes a question and a set of selectable responses, to a user or pull user input via the survey portlet 208. For example, the survey portlet 208 may be a web page accessible by a project participant that the project participant may select to complete at any time. Additionally, the server 102 may configure the project web portal 202 to initially display the survey portlet 208 to a project participant when the project participant accesses the project web portal 202. When the server 102 pushes the survey portlet 208 to a user by configuring the project web portal 202 to initially display the survey portlet 208, the server 102 may receive instantaneous feedback from the project participant via this "polling" capability. A poll may provide answers to the questions and the set of selectable responses in a timelier manner than a survey that the project participant may select to complete at any time.

Similar to the method executed in any of the boxes 306-310, when the frequently asked questions portlet template 124 is first accessed by the user interface 104, the server 102 may create the frequently asked questions portlet 210. Likewise, when the electronic mail portlet template 126 is first accessed by the user interface 104, the server 102 may create the e-mail portlet 212. Furthermore, when the text message portlet template 128 is first accessed by the user interface 104, the server 102 may create the text message portlet 214. In some embodiments, the server 102 may have created the frequently asked questions portlet 210 from the frequently asked questions portlet template 124, the e-mail portlet 212 from the electronic mail portlet template 126, and the text message portlet 214 from the text message portlet template 128 in box 304.

In box 312, a server stores project data in a storage device, wherein the project data includes a user input received via the web log portlet, a discussion data received via the forum portlet, and an answer data received via the survey portlet. For example, the server 102 stores project data for the mobile phone camera project in the storage device 116. In this example, the project data includes user inputs received via the web log portlet for the mobile phone camera project, discussion data received via the forum portlet for the mobile phone camera project, and answers data received via the survey portlet for the mobile phone camera project. By storing the project data from each of the different types of portlets 204-208, the storage device 116 has more comprehensive data for a project than offered by storage of data from any one type of portlet. For example, during the concept phase of the project, the server 102 stores discussion forum suggestions about a mobile phone camera problem received via the forum portlet 206 from engineers who are not working on the mobile phone camera project. The server 102 also stores responses to a web log topic about the mobile phone camera problem received via the web log portlet 204 from engineers who are working on the mobile phone camera project.

The project data may also include a count of accesses via the frequently asked questions portlet 210. For example, the number of times each of the answers to the frequently asked questions was accessed may indicate the frequency of potential problems. Furthermore, the project data may also include an electronic mail received via the electronic mail portlet 212 and a text message received via the text message portlet 214. For example, the number of e-mails received about a specific camera problem before a camera modification and the number of e-mails received about the specific camera problem after the camera modification may indicate the effect of the camera modification. Additionally, the project data may include a number of invited project participants, a number of registered project participants, and a number of project participants that responded to a survey. Such project participant data may indicate how successful the invitation was at convincing invitees to become project participants, or the effectiveness of the method used to push the survey to project participants or pull the survey response from project participants.

The administrator user interface 108 may configure the level of access for project participants participating in multiple projects to the project web portal 202 and the portlets 204-214 for a specific project. Access to the web log portlet 204, the forum portlet 206, and the survey portlet 208 may be limited to the user interfaces that are also provisioned with any project web portal 202. For example, configuring this "open" community enables all project participants for every project to access the photograph storage forum portlet 206 to discuss the general concept of how to store photographs on a mobile camera phone. Access to the project web portal 202 may be limited to the user interfaces associated with project participants for a specific project. For example, configuring this "closed" community only enables project participants for the mobile phone camera project to access the web log portlet 204 to respond to input about the effects of lighting conditions on the photograph resolution for a specific model of a mobile phone camera that is being tested in a product test. The administrator user interface 108 may configure the level of access for project participants as an open community for some of the portlets 204-214 for a project and as a closed community for some of the portlets 204-214 for the same project.

In box 314, test data is optionally stored from a product test. For example, the server 102 stores photographs from a product test for the mobile phone camera in the storage device 116. In this example, project participants may send photographs to the server 102, and the server 102 may retrieve photographs from the mobile phone cameras used in the product test. Such test data may enable a project manager to more accurately evaluate problems identified by project participants. In another example, during the product testing phase of the mobile phone camera project, a project manager can compare the photographs sent to the server 102 with survey answers received via the survey portlet 208 from product testers. Based on this comparison of test data and survey answers, the project manager can devise a solution to a mobile phone camera problem identified by the survey answers and clarified by the photographs. The project manager may also implement the solution to the mobile phone camera problem through firmware over the air and provide an updated survey via the survey portlet to test the solution.

In box 316, an administrator user interface accesses the project data to develop a project. For example, the administrator user interface 108 accesses the project data in the storage device 116 to review project participants' data to select some of the project participants for a future product test. In this example, the administrator may select the project participants who contributed the most helpful suggestions via web logs and forum discussions about photograph resolution to participate in a product test for a mobile phone camera with enhanced photograph resolution. The administrator user interface 108 may associate a keyword with specific content from the project data to assist in the organization of the project data. For example, after reviewing a discussion forum thread about photograph storage for a mobile phone camera, an administrator can assign the keyword "storage" to the discussion forum thread. Subsequent assignments of the same and other keywords may help the administrator in organizing the project data from each of the portlets 204-214 to be accessed together based on keyword searches, even if some of the related project data does not actually include the keyword.

The server 102 may provide project data to the administrator user interface 108 using a desktop widget or a really simple syndication (RSS) feed, such that the administrator does not have to log on to a web site to view the project data. RSS is a family of web feed formats used to publish frequently updated content such as blog entries, news headlines or podcasts. An RSS document, which is called a "feed," "web feed," or "channel," contains either a summary of content from an associated web site or the full text. RSS makes it possible for users to keep up with their favorite web sites in an automated manner that is easier than checking the web sites manually. RSS content can be read using software called an "RSS reader," "feed reader" or an "aggregator." The user subscribes to an RSS feed by entering the feed's link into the reader or by clicking an RSS icon in a browser that initiates the subscription process. The reader checks the user's subscribed feeds regularly for new content, downloading any updates that it finds. A desktop widget is an application which resides on the user's desktop using a small desktop space and computer resources. Yet, a desktop widget provides relevant information to the user in a non-intrusive manner. Basically, desktop widgets enable the user view on-demand, capsuled information from predetermined data sources, such as the project data from the storage device 116 located in the server 102. Ideally, a desktop widget presents personalized content, based on the user's preferences. Desktop widgets assist a user in their area of work by delivering relevant, filtered information right on the user's desktop. A desktop widget can literally beam the most important information that a user requires on a day to day basis.

Figure 4:
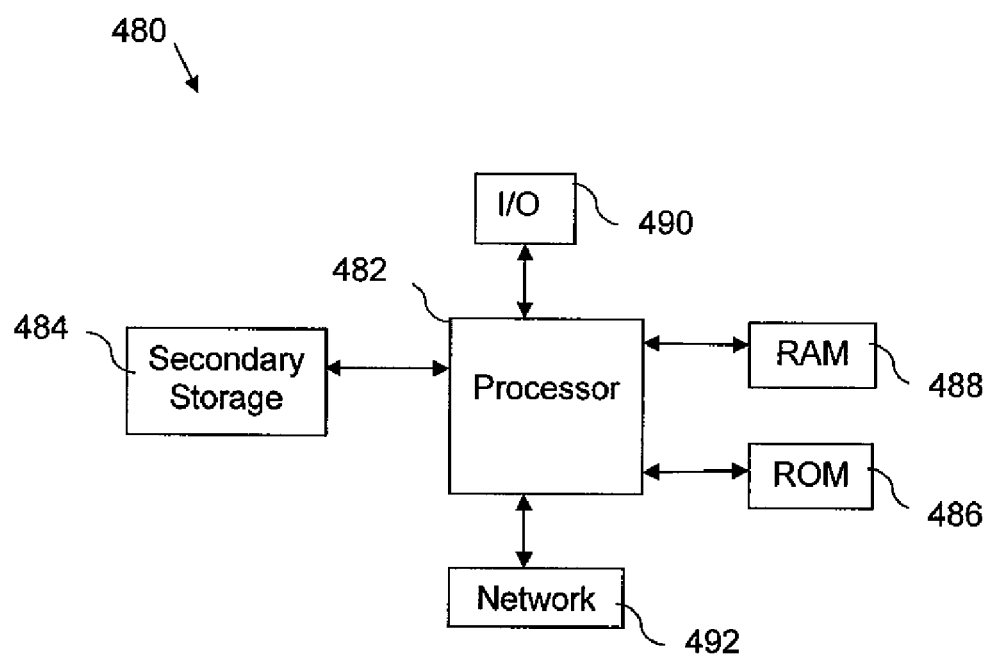
FIG. 4 illustrates an exemplary general-purpose computer system suitable for implementing the several embodiments of the disclosure.

The system described above may be implemented on any general-purpose computer with sufficient processing power, memory resources, and network throughput capability to handle the necessary workload placed upon it. FIG. 4 illustrates a typical, general-purpose computer system suitable for implementing one or more embodiments disclosed herein. The computer system 480 includes a processor 482 (which may be referred to as a central processor unit or CPU) that is in communication with memory devices including secondary storage 484, read only memory (ROM) 486, random access memory (RAM) 488, input/output (I/O) devices 490, and network connectivity devices 492. The processor may be implemented as one or more CPU chips.

The secondary storage 484 is typically comprised of one or more disk drives or tape drives and is used for non-volatile storage of data and as an over-flow data storage device if the RAM 488 is not large enough to hold all working data. The secondary storage 484 may be used to store programs that are loaded into the RAM 488 when such programs are selected for execution. The ROM 486 is used to store instructions and perhaps data that are read during program execution. The ROM 486 is a non-volatile memory device that typically has a small memory capacity relative to the larger memory capacity of secondary storage. The RAM 488 is used to store volatile data and perhaps to store instructions. Access to both the ROM 486 and the RAM 488 is typically faster than to the secondary storage 484.

The I/O devices 490 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 492 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 492 may enable the processor 482 to communicate with an Internet or one or more intranets. With such a network connection, it is contemplated that the processor 482 might receive information from the network, or might output information to the network in the course of performing the above-described method steps. Such information, which is often represented as a sequence of instructions to be executed using the processor 482, may be received from and outputted to the network, for example, in the form of a computer data signal embodied in a carrier wave Such information, which may include data or instructions to be executed using the processor 482 for example, may be received from and outputted to the network, for example, in the form of a computer data baseband signal or signal embodied in a carrier wave. The baseband signal or signal embodied in the carrier wave generated by the network connectivity devices 492 may propagate in or on the surface of electrical conductors, in coaxial cables, in waveguides, in optical media—for example—optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 482 executes instructions, codes, computer programs, scripts that it accesses from hard disk, floppy disk, optical disk (these various disk based systems may all be considered the secondary storage 484), the ROM 486, the RAM 488, or the network connectivity devices 492.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A system for a project web portal, comprising:
a plurality of computers;
a non-transitory storage device;

instructions stored on the non-transitory storage device, when executed by a processor, that provision a project web portal template to the plurality of computers, wherein the project web portal template comprises a web log portlet template, a forum portlet template, and a survey portlet template, that create a web log portlet on one of the computers in response to the computer first accessing the web log portlet template, that create a forum portlet on one of the computers in response to the computer first accessing the forum template, that create a survey portlet on one of the computers in response to the computer first accessing the survey portlet template, wherein the instructions create a project web portal on one of the computers based on the web portal template in response to the computer first accessing any of the web log portlet template, the forum portlet, and the survey portlet, and that store project data in the non-transitory storage device, wherein the project data comprises a user input received via the web log portlet, a discussion data received via the forum portlet, and an answer data received via the survey portlet, wherein the instructions create a project web portal on one of the computers based on the web portal template in response to the computer first accessing any of the web log portlet template, the forum portlet, and the survey portlet; and an administrator computer providing an administrator user interface to access the project data in the non-transitory storage device to develop a project.

2. The system of claim 1, wherein the project web portal template further comprises a frequently asked questions portlet template, wherein the instructions create a frequently asked questions portlet on one of the computers in response to the computer first accessing the frequently asked questions portlet template, and wherein the project data comprises an access via the frequently asked questions portlet.

3. The system of claim 2, wherein at least one of the web log portlet, the forum portlet, the survey portlet, and the frequently asked questions portlet is a collaborative web site which can be directly edited via any of the plurality of computers.

4. The system of claim 1, wherein the project web portal comprises a plurality of web log portlets, wherein each of the plurality of web log portlets is associated with one of the plurality of computers.

5. The system of claim 1, wherein the project web portal comprises a plurality of forum portlets, wherein each of the plurality of forum portlets is associated with one of the plurality of computers.

6. The system of claim 5, wherein each of the plurality of forum portlets comprises a discussion based on a discussion thread.

7. The system of claim 1, wherein the project web portal further comprises an electronic mail portlet and a text messaging portlet and the project data comprises an electronic mail received via the electronic mail portlet and a text message received via the text message portlet.

8. The system of claim 1, wherein the administrator user interface is further configured to associate a keyword with specific content from the project data to assist in the organization of the project data.

9. The system of claim 1, wherein the administrator user interface is further configured to manage project participants, send electronic mail to project participants and send text messages to project participants.

10. The system of claim 1, wherein the project web portal comprises at least one of a terms and conditions portlet, a project participant guidelines portlet, and a user manual portlet.

11. A computer implemented method for a project web portal, comprising:

provisioning a project web portal template to a first plurality of computers, wherein the project web portal template comprises a web log portlet template, a forum portlet template, and a survey portlet template, and wherein the provisioning is performed by an application executing on a computer;

creating by the application a first web log portlet on one of the first plurality of computers based on the web log portlet template when the web log portlet template is first accessed by the one of the first of the plurality of computers;

creating by the application a first forum portlet on one of the first plurality of computers based on the forum portlet template when the forum portlet template is first accessed by the one of the first of the plurality of computers;

creating by the application a first survey portlet on one of the first plurality of computers based on the survey portlet template when the survey portlet template is first accessed by the one of the first of the plurality of computers;

storing a first project data in a non-transitory storage device by the application, wherein the first project data comprises a user input received via the first web log portlet, a discussion data received via the first forum portlet, and an answer data received via the first survey portlet; and accessing the first project data from the non-transitory storage device to develop a first project.

12. The computer implemented method of claim 11, wherein at least one of the project web portal template, the web log portlet template, the forum portlet template, and the survey portlet template is a standardized file type used by computer software as a pre-formatted example on which to base other files.

13. The computer implemented method of claim 11, further comprising registering the first plurality of computers by at least one of manual entry and bulk upload.

14. The computer implemented method of claim 11, furthering comprising at least one of pushing the first survey portlet to a user and pulling user input via the first survey portlet, wherein the first survey portlet comprises a question and a set of selectable responses.

15. The computer implemented method of claim 11, wherein access to the first web log portlet, the first forum portlet, and the first survey portlet is limited to the first plurality of computers and to a second plurality of computers that are provisioned with another project web portal.

16. A computer implemented method for a product test web portal, comprising:

provisioning the product test web portal to a plurality of computers associated with product test participants, wherein the product test web portal comprises a web log portlet, a forum portlet, and a survey portlet, wherein the provisioning is performed by an application executing on a computer;

storing product test data in a non-transitory storage device by the application, wherein the product test data comprises a user input received via the web log portlet, a discussion data received via the forum portlet, and an answer data received via the survey portlet;

accessing the product test data from the non-transitory storage device to manage a product test; and providing product test data by the application to an administrator user interface of an administrator computer via a really simple syndication (RSS) feed.

17. The computer implemented method of claim 16, wherein the product test web portal further comprises a user manual portlet for a product test.

18. The computer implemented method of claim 16, further comprising storing test data from a product test.

19. The computer implemented method of claim 16, wherein the administrator computer is used by a project manager to manage a project, to identify computers associated with the product test participants, and wherein accessing the product test web portal is limited to the plurality of computers associated with the product test participants.

20. The computer implemented method of claim 11, further comprising:

provisioning the project web portal template to a second plurality of computers;

creating by the application a second web log portlet on one of the second plurality of computers based on the web log portlet template when the web log portlet template is first accessed by the one of the second of the plurality of computers;

creating by the application a second forum portlet on one of the second plurality of computers based on the forum portlet template when the forum portlet template is first accessed by the one of the second of the plurality of computers;

creating by the application a second survey portlet on one of the second plurality of computers based on the survey portlet template when the survey portlet template is first accessed by the one of the second of the plurality of computers;

storing a second project data in a non-transitory storage device by the application, wherein the second project data comprises a user input received via the second web log portlet, a discussion data received via the second forum portlet, and an answer data received via the second survey portlet; and accessing the second project data from the non-transitory storage device to develop a second project.

\* \* \* \* \*